United States Patent [19]

Mudde

[11] 3,816,170

[45] June 11, 1974

[54] VAPOR PERMEABLE COMPOSITIONS

[75] Inventor: John P. Mudde, Oak Lawn, Ill.

[73] Assignee: CPC International Inc., Englewood Cliffs, N.J.

[22] Filed: Apr. 14, 1972

[21] Appl. No.: 244,251

Related U.S. Application Data

[63] Continuation-in-part of Ser. Nos. 226,202, Feb. 14, 1972, abandoned, and Ser. No. , , which is a continuation-in-part of Ser. No. 122,148, March 8, 1971, abandoned.

[52] U.S. Cl. 117/161 UN, 117/161 UA, 117/161 UZ, 117/124 E, 117/138, 117/139.5, 161/DIG. 2, 161/247, 161/160, 260/2.5 R, 260/33.4 R, 260/34.2, 260/899, 260/884, 260/857, 260/859, 260/873

[51] Int. Cl. ............................................. B44d 1/12

[58] Field of Search ............. 117/161 UN, 161 UA, 117/161 UZ, 124 E; 161/247, 411, DIG. 2; 260/2.5 AY, 33.4 R

[56] References Cited
UNITED STATES PATENTS

| | | | |
|---|---|---|---|
| 2,831,826 | 4/1958 | Coover | 260/32.8 |
| 3,055,297 | 9/1962 | Leeds | 260/2.5 AY |
| 3,318,836 | 5/1967 | Joyce | 260/33.4 R |

OTHER PUBLICATIONS

Kirk–Othmer, "Poromeric Materials", p. 355 by J. L. Hollowell.

Primary Examiner—George F. Lesmes
Assistant Examiner—Ellis P. Robinson
Attorney, Agent, or Firm—Albert P. Halluin

[57] ABSTRACT

This invention discloses a water vapor permeable film-forming composition comprising: (a) a hydrophilic thermoplastic polymeric material comprising from about 10 to about 60 parts by weight of a homopolymer, copolymer or graft copolymer of an unsaturated amide of the formula:

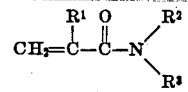

wherein $R^1$ is selected from the group consisting of hydrogen and alkyl of up to four carbon atoms, $R^2$ and $R^3$ are alkyl of up to four carbon atoms; and (b) a hydrophobic polymeric material comprising from about 90 to about 40 parts by weight of a polymer selected from the group consisting of a polymer of vinyl chloride, polyurethane, poly(methyl methacrylate), polyamide, polypropylene and polyester.

10 Claims, No Drawings

VAPOR PERMEABLE COMPOSITIONS

This application is a continuation-in-part of copending application Ser. No. 226,202, filed Feb. 14, 1972, which in turn is a continuation-in-part of copending application Ser. No. 122,148, filed Mar. 8, 1971 both applications now abandoned.

This invention relates to new polymeric compositions having water vapor permeable and absorbance properties. More particularly, this invention concerns water vapor permeable compositions having good physical properties which render them useful for preparing a variety of coatings, films, and sheet materials.

A great number of synthetic vapor permeable materials have been prepared in the last 10 years in an effort to simulate leather and to increase the comfort of wearing apparel which has been prepared from synthetic polymeric materials. During the early development of synthetic vapor permeable materials, such products were prepared by applying polymeric coatings to porous substrates, followed by piercing the coatings with an embossing roll. This procedure leaves visible holes in the coating which greatly detracts from the appearance of products made to simulate leather.

Further work resulted in the preparation of porous structures by incorporating blowing agents and air into the compositions to form a froth. Inclusion of volatile liquids in the composition was also used to blow a porous structure, such as water in poly(vinyl chloride) plastisols. Compositions containing soluble particles such as salt, ureas, starches, and sugar were leached with chemicals capable of dissolving or degrading the particles to result in a permeable porous matrix. A refinement of this technique resulted in the use of soluble fibers which, when leached out of the composition, produces a network of fiber-sized holes. Another variation provided for the inclusion in the coating composition of fine fragile hollow spheres which are subsequently crushed by working the composition, leaving a permeable network.

Various additional methods for producing vapor permeable coatings have been devised. For example, polymer solutions such as cellulose nitrate, cellulose acetate, urethane, or nylon have been slowly precipitated in the presence of non-solvent liquids or vapors to form microporous structures. Poly(vinyl alcohol) can be gelled with formaldehyde to yield a fine-pored sponge. Dry powders of hard polymers such as poly(vinyl chloride) can be sintered to provide structures of a variety of pore sizes.

It is apparent that all of the above-described methods of producing vapor permeable films or coatings rely on the presence of actual open passageways to carry the moisture through the permeable substance. Alternative means have been employed to impart vapor permeability to polymer coatings, whereby moisture-sensitive chemical groups are incorporated into various polymer backbones. Further, moisture-sensitive polymers have been dispersed in a matrix of hydrophobic polymer to provide compositions wherein the water vapor transmission takes place by diffusion through the hydrophilic moieties. While most of these coatings exhibit water-vapor permeation, they tend to lose some of the physical properties upon extended exposure to water. In many instances, these films become swollen, sticky, and lose their tensile strength.

It has now been found that water vapor permeable and absorbant films, coatings, and sheet materials can be readily prepared which have good physical properties upon extended exposure to water. Contrary to the blends in which the moisture-sensitive polymers are merely dispersed within the hydrophobic matrix, in the present composition the hydrophilic materials fuse with the hydrophobic material to form a homogeneous blend which results in completely clear films when milled. Since all materials in the blends are thermoplastic and remain so, they can be formed into very thin, clear smooth films, which will swell uniformly when exposed to moisture, but will regain their original shape and properties after subsequent drying. In most of the previously mentioned blends, only the hydrophobic phase swells, resulting in a rough surface and loss of strength.

The present invention resides in a water vapor permeable composition comprising (a) a hydrophilic linear thermoplastic polymeric material comprising from about 10 to about 60 parts by weight of a homopolymer, copolymer or graft copolymer of an unsaturated amide of the formula:

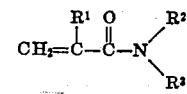

wherein $R^1$ is selected from the group consisting of hydrogen and alkyl of up to 4 carbon atoms, $R^2$ and $R^3$ are alkyl of up to four carbon atoms; and (b) a hydrophobic polymeric material comprising from about 90 to about 40 parts by weight of a polymer selected from the group consisting of a polymer of vinyl chloride, polyurethane, poly(methyl methacrylate), polyamide, polypropylene and polyester.

The term "linear" is used herein to designate both straight chain branched and graft polymers but to the exclusion of cross-linked and thermoset materials.

The hydrophilic thermoplastic polymeric materials of an alpha-beta-unsaturated amide described above are known in the art.

The alpha-beta-unsaturated amides are produced by many known syntheses, such as by the pyrolysis of the reaction product of beta-propiolactone and an alkyl amine, as described in U.S. Pat. No. 2,548,155. The preferred polymers of alpha-beta-unsaturated amides are prepared from N,N-dimethylacrylamide.

The homopolymers and copolymers of the above-described unsaturated amides may be prepared in solution systems by charging the monomers and a free-radical catalyst such as benzoyl peroxide to a polymerization bottle or flask containing hexane, heptane or a similar liquid transfer medium and equipped for temperature control, agitation and condensation of reaction vapors. Several hours of heating and stirring at 50°–70° C produces a polymer or copolymer that can be filtered, washed and vacuum dried at 40°–50° C.

The comonomers suitable for preparing the copolymers of the alpha-beta-unsaturated amides may be any polymerizable monomer whose polymer has a glass transition temperature below that of a homopolymer of the alpha-beta-unsaturated amide. Exemplary monomers include butyl acrylate, 2-ethylhexyl acrylate, acrylonitrile and vinyl acetate, butyl acrylate being preferred.

Graft copolymers of alpha-beta-unsaturated amides suitable as the hydrophilic thermoplastic polymeric materials can be prepared by methods known in the art. One preferred method includes grafting the alpha-beta-unsaturated amide onto a backbone polymer having the proper glass transition temperature as alluded to above. For example, N,N-dimethylacrylamide can be grafted onto the backbone of butyl acrylate using benzoyl peroxide.

The hydrophobic polymeric materials of the polyblends of the invention are well known and readily available. Examples of suitable hydrophobic polymeric materials include polymers of vinyl chloride, polyurethane, poly(methyl methacrylate), polyamide and polyester.

The polymers of vinyl chloride include poly(vinyl chloride), copolymers of vinyl chloride with vinyl acetate, vinylidene chloride or acrylonitrile, as well as plasticized polymers and copolymers of vinyl chloride containing at least about 85 percent by weight poly(vinyl chloride).

The polyurethane polymers which can be used in the water vapor permeable composition can vary greatly and include both the reaction products of isocyanates with polyethers, as well as polyesters. Exemplary isocyanates useful for preparing the polyurethane polymers which can be used in the vapor permeable compositions of the present invention include tolylene diisocyanate, 4,4'-diphenylmethane diisocyanate, tolidine diisocyanate, hexamethylene diisocyanate, m-xylylene diisocyanate, and the like.

Exemplary polyethers for preparing the polyurethane polymers include poly(oxypropylene)glycols, poly(oxypropylene) adducts of glycerol, poly(oxypropylene) adducts of trimethylolpropane, poly(oxypropylene) adducts of 1,2,6-hexanetriol, poly(oxypropylene) adducts of pentacrylthritol, poly(oxypropylene) adducts of sorbitol, polytetrahydrofuran polyethers extended with m-ethylene-bis-phenyldiisocyanate and hydrazine, and the like.

The polyesters for the urethane polymers of this invention include the reaction products of adipic acid or phthalic anhydride with any of ethylene glycol, propylene glycol, 1,3-butylene glycol, 1,4-butylene glycol, diethylene glycol, 1,2,6-hexanetriol trimethylolpropane or 1,1,1-trimethylolethane.

The polyamides useful in the present invention can be exemplified by 6-nylon, 6,6-nylon, 6,10-nylon and copolymers thereof.

The poly(methyl methacrylate) polymers useful for the present invention are the well known commercially available products.

The polyesters which can be used in the water vapor permeable composition are the fiber forming reaction products of aromatic dicarboxylic acids with polyhydroxy compounds and include poly(ethylene)-terephthalate and poly(cyclohexanedimethanol)-terephthalate.

In addition to the essential ingredients which consist of the polymers heretofore described, it can be preferred, in some instances, to incorporate additional ingredients into the water vapor permeable compositions of this invention. A plasticizer for one or both of the polymeric materials in an amount of from about 5 to about 100 parts by weight per 100 parts by weight of combined hydrophilic and hydrophobic polymeric material can be desirable in many instances. The particular amount of plasticizer employed will depend on the hydrophobic polymer used, as well as the ratio of hydrophilic to hydrophobic polymeric material and the end use of the product. When the hydrophobic polymeric material is poly(vinyl chloride), for example, a plasticizer can be used to render the resulting composition flexible, as well as elastomeric.

Exemplary plasticizers which can be used are dioctyl phthalate, tricresyl phosphate, trioctyl phosphate; adipate, azelate and sebacate esters; trioctyl malletate esters and polyesters, such as the Paraplex products of Rohm and Haas.

Other ingredients which can be incorporated into the vapor permeable compositions comprise coloring pigments, fillers, heat stabilizers, UV absorbers, and the like. The use of these additives is well understood in the art and needs no further elaboration herein.

As heretofore indicated, the water vapor permeable compositions of this invention contain from about 10 to 60 parts by weight of the hydrophilic thermoplastic polymeric material and 90 to 40 parts by weight of the hydrophobic polymeric material, as have been described. In a preferred embodiment of the present invention, the composition comprises from about 25 to about 50 parts by weight of the hydrophilic thermoplastic polymeric material and from about 75 to about 50 parts by weight of the hydrophobic polymeric material. Best results are generally obtainable by using an equal weight mixture of the hydrophilic polymeric material and the hydrophobic polymer. Generally speaking, an increase in the proportion of the first polymer to that of the second will result in an increase in water vapor transmission and absorbance and a decrease in tensile strength of films or sheets prepared therefrom. As a result, the respective proportions of the polymers can be varied to obtain a balance of properties in the final product.

The vapor permeable compositions of the present invention can be prepared by physically blending the individual components in various ways, such as solvent or emulsion blending followed by evaporation of the medium, or dry shear blending at elevated temperatures.

Solvent blending comprises dissolving the thermoplastic hydrophilic and the hydrophobic polymeric materials in a mutual solvent, casting the solution onto a desired substrate and evaporating the solvent, leaving the vapor permeable composition as a film or coating on the substrate. This film can be left remaining on the substrate or can be stripped by suitable means as desired. This method of preparing the compositions of this invention is useful when thin films or coatings are required or when maximum penetration into a porous or woven substrate is desired.

In many instances, the hydrophobic polymeric material hereinabove described is available in the form of an emulsion. Since the polymers prepared from the defined unsaturated amides are water-soluble, aqueous solutions of these polymers can be readily dispersed in the emulsion of the second polymer to obtain homogeneous blends. The resulting mixtures can then be coated onto desired substrates followed by the evaporation of water to produce the vapor permeable composition. The blending of aqueous solutions of the first polymer with emulsions of the second polymer has the advantage of eliminating the safety hazard accompanying the use of volatile solvents.

The preferred method of preparing the water vapor permeable compositions of this invention comprises blending the polymers in the dry state and without the use of solvents. This can be effected by first mixing the required components in granular or powder form and thereafter subjecting the mixture to moderately high shear forces at a temperature near the softening point of the mixture. All of the additives desired in the final composition can also be initially added to the mixture. A variety of process equipment is available which can impart sufficient shear to result in intimate blending. Two-roll mills, such as are used in the rubber industry, sigma blenders, Banburry blenders, and screw extruders are examples of such equipment. The temperature at which the polymer mixture is worked will vary with the selection of the individual components, but will be near the softening point of the polymers used. Care must be exercised, however, not to approach the decomposition temperature of any of the components. Heat stabilizers for the polymer can be used when the decomposition of the polymers becomes a problem. In many instances, the use of a plasticizer will reduce the temperature at which a particular polymer blend can be worked on the equipment heretofore described.

The water vapor permeable and absorbable compositions of the present invention and their preparation is more specifically illustrated in the following examples.

EXAMPLE 1

Production Of A Vapor Permeable Film From A Poly(Vinyl Chloride)-Poly(N,N-Dimethylacrylamide) Polyblend Powdered poly(vinyl chloride) (50 grams; Vygen, a product of General Tire and Rubber Co.), powdered poly(N,N-dimethylacrylamide) (50 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 2

Production Of A Vapor Permeable Film From A Poly(Vinyl Chloride)-Poly)N,N-Dimethylacrylamide) Polyblend Powdered poly(vinyl chloride) (60 grams; Vygen, a product of General Tire and Rubber Co.), powdered poly(N,N-dimethylacrylamide) (40 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off th mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 3

Production Of A Vapor Permeable Film From A Poly(Vinyl Chloride)-Poly(N,N-Dimethylacrylamide) Polyblend Powdered poly(vinyl chloride) (67 grams; Vygen, a product of General Tire and Rubber Co.), powdered poly(N,N-dimethylacrylamide) (33 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 4

Production Of A Vapor Permeable Film From A Poly(Vinyl Chloride)-Poly(N,N-Dimethylacrylamide) Polyblend Powdered poly(vinyl chloride) (75 grams; Vygen, a product of General Tire and Rubber Co.), powdered poly(N,N-dimethylacrylamide) (25 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 5

Production Of A Vapor Permeable Film From A Poly(Vinyl Chloride)-Poly(N,N-Dimethylacrylamide) Polyblend Powdered poly(vinyl chloride) (86 grams; Vygen, a product of General Tire and Rubber Co.), powdered poly(N,N-dimethylacrylamide) (14 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a

EXAMPLE 6

Production Of A Vapor Permeable Film From A Poly(Vinyl Chloride)-Poly(N,N-Dimethylacrylamide) Polyblend Powdered poly(vinyl chloride) (60 grams; Vygen, a product of General Tire and Rubber Co.), powdered poly(N,N-dimethylacrylamide) (40 grams) and barium-cadmium stearate heat stabilizer (3 grams) were blended in a paper cup. A low molecular weight polyester plasticizer (60 grams, Paraplex G-33, a product of Rohm and Haas Co.) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 7

Production Of A Vapor Permeable Film From A Poly(Vinyl Chloride)-Poly(N,N-Dimethylacrylamide) Polyblend Powdered poly(vinyl chloride) (60 grams; Vygen, a product of General Tire and Rubber Co.), powdered poly(N,N-dimethylacrylamide) (40 grams) and barium-cadmium stearate heat stabilizer (3 grams) were blended in a paper cup. Dioctyl phthalate (100 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 8

Production Of A Vapor Permeable Film From A Polyurethane-Poly(N,N-Dimethylacrylamide) Polyblend Granular polyurethane rubber (60 grams; Estane, a product of B.F. Goodrich Co.), and powdered poly(N,N-dimethylacrylamide) (40 grams) were blended in a paper cup. The mixture was then worked on a two-roll mill at a temperature of from about 300° F to about 325° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 to 20 mils. The sheets were then cooled to room temperature to yield the desired product.

EXAMPLE 9

Production Of A Vapor Permeable Film From A Poly(Methyl Methacrylate)-Poly(N,N-Dimethylacrylamide) Polyblend Granulated poly(methyl methacrylate) (75 grams), powdered poly(N,N-dimethylacrylamide) (25 grams) were blended in a paper cup. The mixture was then worked on a two-roll mill at a temperature of about 300° to 325° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mills. The sheets were then cooled at room temperature to yield the desired product.

EXAMPLE 10

Production Of A Vapor Permeable Film From A Polyamide-Poly(N,N-Dimethylacrylamide) Polyblend Granulated polyamide (75 grams; nylon 6.6) and powdered poly-(N,N-dimethylacrylamide) (25 grams) were mixed together. The mixture was placed into a small laboratory screw extruder at a temperature of about 500° F and was extruded to produce a homogeneous product. The product was then molded by pressing at a temperature of about 500° F between two chromed steel plates separated by suitable spacing frames to provide thin sheets having a thickness of 10 and 20 mils. The sheets were then cooled to room temperature to yield the desired vapor permeable product.

EXAMPLE 11

Production Of A Vapor Permeable Film From A Polyester-Poly(N,N-Dimethylacrylamide) Polyblend Powdered polyester, a reaction product of phthalic acid and a diol (75 grams; Vituf, a product of Goodyear Corp.) and powdered poly-(N,N-dimethylacrylamide) (25 grams) were blended into a uniform mixture. The mixture was then placed into a laboratory extruder at a temperature of about 550° F and was extruded to produce a homogeneous product. The product was then molded by pressing at a temperature of about 500° F between two chromed steel plates separated by suitable spacing frames to provide thin sheets having a thickness of 10 and 20 mils. The sheets were then cooled to room temperature to yield the desired vapor permeable product.

EXAMPLE 12

Production Of A Vapor Permeable Film From A Poly(Vinyl Chloride)-Poly(N,N-Dimethylacrylamide) Polyblend Powdered poly(vinyl chloride) (40 grams; Vygen, a product of General Tire and Rubber Co.), powdered poly(N,N-dimethylacrylamide) (60 grams) and barium-cadmium stearate heat stabilizer (3 grams) are blended in a paper cup. Tricresyl phosphate (60 grams) is added to the polymer blend and stirred into a uniform mixture. The mixture is then worked on a two-roll mill at a temperature of about 300° F until fused. After this time, the fused mixture is milled for an additional period of from about 5 to 10 minutes to ensure a uniform plastic mass. This mass is then taken off the mill and is pressed at a temperature of about 300° F between two chromed steel plates separated by suitable spacing frames to provide thin sheets having a thickness of 10 and 20 mils. The sheets are then cooled to room temperature to yield the desired product.

The properties of the water vapor permeable compositions of the present invention were determined by various standard testing techniques.

The ability of the compositions to absorb water both at room temperature as well as at the boiling temperature of water was determined by measuring the weight change of a sample after immersion for a given period of time. The test specimens were in the form of a bar 5 inches in length by 1/2 inch in width and 20 mils in thickness. After being weighed, the specimens were immersed in distilled water for a period of 1 hour and 18 hours at room temperature and for a period of 1 hour in boiling. The test specimens were then wiped and immediately weighed to determine the water absorption capacity of the composition. After the initial weighing the specimens were dried at a temperature of 70° C for a period of 2 hours and were weighed again to determine amount of material which was leached out of the composition during the immersion period. The results of these experiments are shown in the following tables. Table 1 shows the weight change of the specimens representing the water absorption of the compositions of this invention after various immersion periods in both water at room temperature and at boiling temperature. Table 2 shows the weight change of dry samples after having undergone the water absorption test and represents loss of product due to leaching out of hydrophilic material from the compositions. The results in Tables 1 to 3 are expressed in percent by weight.

TABLE 1

Water Absorption Of Test Compositions

| Test Specimen | Immersion Period | | |
|---|---|---|---|
| | 1 Hour at R. T. | 18 Hours at R. T. | 1 Hour at 100°C |
| Product of Example 1 | 31 | 44 | 44 |
| Product of Example 2 | 19 | 21 | 19 |
| Product of Example 3 | 1.9 | 9 | 12 |
| Product of Example 4 | 1.1 | 6 | 10 |
| Product of Example 5 | 0.5 | 3 | 6 |
| Product of Example 6 | 15 | 23 | 33 |
| Product of Example 7 | 13 | 18 | 11 |
| Product of Example 8 | 107 | 205 | Decomposed |
| Product of Example 9 | 2.9 | 7.9 | 19 |
| Product of Example 10 | 6.8 | 15.4 | 15.7 |

TABLE 2

Weight Change Of Dry Compositions After Absorption Test

| Test Specimen | Immersion Period | | |
|---|---|---|---|
| | 1 Hour at R. T. | 18 Hours at R. T. | 1 Hour at 100°C |
| Product of Example 1 | Not tested | −1.0 | −1.5 |
| Product of Example 2 | −0.7 | −0.7 | −0.6 |
| Product of Example 3 | −0.1 | −0.07 | −0.3 |
| Product of Example 4 | −0.1 | −0.13 | −0.2 |
| Product of Example 5 | 0.0 | −0.06 | +0.1 |
| Product of Example 6 | Not tested | −1.4 | −1.8 |
| Product of Example 7 | −0.2 | −0.3 | −0.15 |
| Product of Example 8 | Not tested | −3.0 | Decomposed |
| Product of Example 9 | −1.2 | −1.0 | +0.6 |
| Product of Example 10 | +1.2 | +0.17 | +2.1 |

The water absorption properties of the second polymers used in the compositions set forth in the examples were determined for control purposes. In these experiments, procedures identical to those described for the compositions in Table 1 were used. Furthermore, the identical second polymers as used in the compositions of the examples were utilized. The results of these tests are shown in Table 3.

TABLE 3

Water Absorption Of Control Samples

| Test Specimen | Immersion Period | | |
|---|---|---|---|
| | 1 Hour at R. T. | 18 Hours at R. T. | 1 Hour at 100°C |
| Poly(vinyl chloride)* | 0.04 | 0.1 | 1.5 |
| Polyurethane rubber | 1.0 | 1.0 | Melted |
| Poly(methyl methacrylate) | 0.2 | 1.0 | 2.2 |
| Polyamide | 1.3 | 6.2 | 7.0 |

*The sample contained 60 parts by weight dioctyl phthalate plasticizer per 100 parts by weight of poly(vinyl chloride).

The tensile strength in pounds per square inch of the various vapor permeable compositions of this invention was determined under various conditions hereinafter referred to as condition A, B, C, or D. The tensile properties were measured in accordance with the procedures detailed by ASTM Method D638-64T. Condition A represents the state of the product after preparation in accordance with the Examples herein set forth. Condition B represents the state of the product after immersion in boiling water for a period of one hour, followed by drying at a temperature of 70° C for a period of 2 hours. Condition C represents the state of the product after exposure to 85 percent relative humidity for a period of 18 hours at room temperature. Condition D represents the state of the product after immersion in water at room temperature for a period of 18 hours, followed by drying at 70° C for a period of 2 hours. The results of these tests expressed in pounds per square inch are shown in Table 4.

TABLE 4

| Test Specimen | Tensile Strength Condition | | | |
|---|---|---|---|---|
| | A | B | C | D |
| Product of Example 1 | 1250 | 1220 | Not tested | 1300 |
| Product of Example 2 | 1800 | 1890 | 1250 | 1700 |
| Product of Example 3 | 2020 | 2040 | 1360 | 1680 |
| Product of Example 4 | 2000 | 2110 | 1270 | 1800 |
| Product of Example 5 | 2370 | 2300 | 2000 | 2040 |
| Product of Example 6 | 1070 | 1200 | Not tested | 1050 |
| Product of Example 7 | 500 | 500 | 380 | 480 |
| Product of Example 8 | 5200 | 460 | 1050 | Decomposed |
| Product of Example 9 | 5800 | 6700 | 6800 | 8800 |

The effectiveness of the compositions of this invention as vapor permeable materials was demonstrated in experiments wherein the water vapor transmission of sheets having a thickness of 10 mils was measured. The procedure of ASTM Test Method E96-63T(B) was used in this experiment. This procedure comprises measuring the amount of water vapor in grams which will permeate a sample which is exposed to 100 percent relative humidity on one side and 50 percent relative humidity on its other side. The results of this procedure are expressed in grams of water transmitted in 24 hours per square meter of surface. The data is shown in Table 5.

TABLE 5

Water Vapor Transmission

|  | g/24 hrs/m² |
|---|---|
| Product of Example 1 | 550 |
| Product of Example 2 | 380 |
| Product of Example 3 | 48 |
| Product of Example 4 | 28 |
| Product of Example 5 | 16 |
| Product of Example 6 | 280 |
| Product of Example 7 | 300 |
| Product of Example 8 | 472 |

The water vapor transmission of poly(vinyl chloride) plasticized with dioctyl phthalate in a 100 to 60 parts by weight ratio was also determined for the purpose of a control and was found to be 9 g/24 hrs/m².

Films prepared from polyblends of hydrophobic polymers, such as poly(vinyl chloride) and various modified polymers of unsaturated amides have been found to possess excellent physical properties, and in some instances, superior properties as compared to the polyblends utilizing homopolymers of the unsaturated amides are obtained with the modified polymers. For example, copolymers of the unsaturated amides with polymers having a lower glass transition temperature have been found to have a profound effect on the strength of the polyblend films. Other modified polymers of the unsaturated amides include graft copolymers of the unsaturated amides, such as the graft copolymer of N,N-dimethylacrylamide and butyl acrylate prepared by grafting the former onto a poly(butyl acrylate) backbone with a free-radical catalyst, e.g., benzoyl peroxide.

EXAMPLE 13

Production Of A Vapor Permeable Film From A Poly(Vinyl Chloride)-Poly(N,N-Dimethylacrylamide)/Butyl Acrylate Copolymer Polyblend The copolymer of N,N-dimethylacrylamide/butyl acrylate was prepared in a non-aqueous heterogeneous polymerization system using heptane as the transfer medium and a stearate salt as a surfactant. The polymerization was initiated with azo-bis(isobutyronitrile) to produce a copolymer in the form of a suspension or unstable emulsion of intermediate particle size between normal aqueous suspension and emulsion polymers. The copolymer was recovered by filtration and was analyzed to be composed of 90/10 poly(N,N-dimethylacrylamide)/butyl acrylate copolymer.

Powdered poly(vinyl chloride) (45 grams; Vygen 110, a product of General Tire and Rubber Co.), powdered copolymer of N,N-dimethylacrylamide and butyl acrylate as prepared above (55 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 14

Production Of A Vapor Permeable Film From A Poly(Vinyl Chloride)-Poly(N,N-Dimethylacrylamide)/Butyl Acrylate Copolymer Polyblend Powdered poly(vinyl chloride) (50 grams; Vygen 110, a product of General Tire and Rubber Co.), powdered copolymer of poly(N,N-dimethylacrylamide) and butyl acrylate as prepared in Example 13 (50 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 15

Production Of A Vapor Permeable Film From A Poly(Vinyl Chloride)-Poly(N,N-Dimethylacrylamide)/Butyl Acrylate Copolymer Polyblend Powdered poly(vinyl chloride) (55 grams; Vygen 110, a product of General Tire and Rubber Co.), powdered copolymer of poly(N,N-dimethylacrylamide)/butyl acrylate as prepared in Example 13 above (45 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 16

Production Of A Vapor Permeable Film From A Poly(Vinyl Chloride)-Poly(N,N-Dimethylacrylamide)/Butyl Acrylate Copolymer Polyblend Powdered poly(vinyl chloride) (60 grams; Vygen 110, a product of General Tire and Rubber Co.), powdered copolymer of poly(N,N-dimethylacrylamide)/butyl acrylate (40 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 17

Production Of A Vapor Permeable Film From A Poly(Vinyl Chloride)-Poly(N,N-Dimethylacrylamide)/Butyl Acrylate Copolymer Polyblend Powdered poly(vinyl chloride) (65 grams; Vygen 110, a product of General Tire and Rubber Co.), powdered copolymer of poly(N,N-dimethylacrylamide)/butyl acrylate as prepared in Example 13 above (35 grams) and barium-cadmium stearate heat stabilizer (3 grams) were blended in a paper cup. Dioctyl phthalate (60 grams) was added to the polymer blend and stirred into a uniform mixture. The mixture was then worked on a two-roll mill at a temperature of about 300° F until fused. After this time, the fuxed mixture was milled for an additional period of from about 5 to 10 minutes to ensure a uniform plastic mass. This mass was then taken off the mill and was pressed at a temperature of about 300° F bewteen two chromed steel plates separated by suitable spacing frames to provide thin sheets having a thickness of 10 and 20 mils. The sheets were then cooled to room temperature to yield the desired product.

The properties of the water vapor permeable compositions prepared in Examples 13 to 17 were determined by various standard testing techniques, as more specifically described above with respect to Examples 1 through 10. The results of these tests are summarized below in Table 6.

monomers having a glass transition temperature (Tg) lower than poly(N,N-dimethylacrylamide) were also found to have similar water vapor permeable properties when blended with poly(vinyl chloride) e.g., 2-ethylhexyl acrylate, acrylonitrile and vinyl acetate were found to produce copolymers with N,N-dimethylacrylamide which formed stable polyblends with poly(vinyl chloride).

It was also unexpectedly noted that the addition of the acrylamide polymers to plasticized poly(vinyl chloride) polyblends of the invention does not result in a reduction of abrasion resistance and the low temperature properties of poly(vinyl chloride) are not changed. It was discovered, also, that depending on the plasticizer used, no embrittlement is encountered to −20° F.

Similar beneficial water vapor permeable properties were obtained by blending the copolymer of N,N-dimethylacrylamide and butyl acrylate with other hydrophobic polymers, such as polypropylene, poly(methyl methacrylate), polyamide (Nylon), polyurethane and polyacrylonitrile. Films from these polyblends also absorbed and transpired moisture much like leather.

It has been discovered that the quality of the unsaturated polymer can have an adverse effect on the resulting milled film. For example, if the polymer of the unsaturated amide such as poly(N,N-dimethylacrylamide) contains hard particles these particles often will not fuse with poly-(vinyl chloride) and dioctyl phthalate during the milling process. The resulting films will thereby contain numerous small specks

TABLE 6

| Of Test Composition | | % Water Absorption | | |
|---|---|---|---|---|
| Test Specimen | WVT[a]<br>g/24 hrs/m² | 18 Hours<br>at<br>85% r.h.[b] | 18 Hours<br>at<br>R. T.[c] | 1 Hour<br>at<br>100°C |
| Product of Example 13 | 450 | 8.8 | 39 | 43.5 |
| Product of Example 14 | 370 | 7.9 | 33 | 35.7 |
| Product of Example 15 | 270 | 7.4 | 27 | 23.8 |
| Product of Example 16 | 150 | 6.4 | 24 | 14.2 |
| Product of Example 17 | 50 | 5.3 | 14 | 13.2 |

[a]Water Vapor Transmission
[b]Relative Humidity
[c]Room Temperature

The data in Table 6 illustrates that the polyblends of poly(vinyl chloride) and the copolymer of N,N-dimethylacrylamide and butyl acrylate possess excellent water vapor transmission and water vapor absorption properties. It is also evident from the data set forth in Table 6 that these properties are enhanced by employing increasing amounts of the hydrophilic polymer. Stated otherwise, water vapor permeability of the films is reduced by decreasing the relative amount of the acrylamide polymer in the composition.

The polyblends prepared in Examples 13 to 17 were clear thermoplastics having an unexpectedly improved compatibility with poly(vinyl chloride), as compared with the polyblend of the homopolymer of N,N-dimethylaerylamide. The copolymer produces stronger films free from imperfections, such as "fish eyes." The loss of copolymer after prolonged immersion periods in water at room temperature or at 100° C does not exceed 1 percent, which points to the unusual stability of this polyblend.

Copolymers of N,N-dimethylacrylamide with other which become even more conspicuous after stretching of the film or after exposure to humid conditions. Additionally, when pigments are used to color the films, these particles will not absorb the pigments with the result of spotted appearance in the film. The water vapor transmission of these films containing the infusible particles is also greatly reduced, as well as the tensile strength.

One means for obviating the foregoing problem is to increase the shear on the mill, e.g., by milling the material without the use of a plasticizer followed by the addition of the plasticizer after the poly-(vinyl chloride) and poly(N,N-dimethylacrylamide) mixture has been fused. This method, however, is sometimes not very practical and results in some degradation due to the severe conditions in the initial stage.

It has now been found that the presence of these particles can be completely eliminated and more uniform results can be obtained by the treatment of the polymer of the unsaturated amide such as poly(N,N-dimethylacrylamide) with water. It appears as though the water softens the polymer and lowers the Tg sufficiently to enable it to blend smoothly with the hydrophobic polymer, poly(vinyl chloride) and the plasticizer, dioctyl phthalate, using normal, relatively mild conditions on the mill.

The following Examples illustrate the beneficial results obtainable by incorporating moisture in the polymer of the unsaturated amide.

EXAMPLE 18

Production Of A Vapor Permeable Film From A Poly(Vinyl Chloride)-Poly(N,N-Dimethylacrylamide) Polyblend Powdered poly(vinyl chloride) (90 grams; Vygen 110, a product of General Tire and Rubber Co.), poly(N,N-dimethylacrylamide) containing hard chunks (60 grams) and barium-cadmium stearate heat stabilizer (3 grams) were blended in a paper cup. Dioctyl phthalate (90 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

EXAMPLE 19

Production Of A Vapor Permeable Film From A Poly(Vinyl Chloride)-Poly(N,N-Dimethylacrylamide) Polyblend Powdered poly(vinyl chloride) (90 grams; Vygen 110, a product of General Tire and Rubber Co.), poly(N,N-dimethylacrylamide) (60 grams) which had been mixed with 60 grams of water and left overnight at room temperature and barium-cadmium stearate heat stabilizer (3 grams) were blended in a paper cup. Dioctyl phthalate (90 grams) was added to the polymer blend and stirred into a uniform mixture. The mixture was then worked on a two-roll mill at a temperature of about 300° F until fused. After this time, the fused mixture was milled for an additional period of from about 5 to 10 minutes to ensure a uniform plastic mass. This mass was then taken off the mill and was pressed at a temperature of about 300° F between two chromed steel plates separated by suitable spacing frames to provide thin sheets having a thickness of 10 and 20 mils. The sheets were then cooled to room temperature to yield the desired product.

It was noted that the water flashed off during the first few minutes of the milling process. Contrary to the films prepared in Example 18 which were slightly hazy and showed many specks upon stretching, the films prepared from the water soaked poly(N,N-dimethylacrylamide) were glossy and clear and remained so after elongation.

EXAMPLE 20

Production Of A Vapor Permeable Film From A Poly(Vinyl Chloride)-Poly(N,N-Dimethylacrylamide) Polyblend The procedure in Example 18 above was repeated, except that the poly(N,N-dimethylacrylamide) polymer was exposed to ambient conditions of relative humidity for six days. During this time, the water content of the polymer increased from an initial 1.3 percent to 5.0 percent as determined by the Karl Fischer method.

EXAMPLE 21

Production Of A Vapor Permeable Film From A Poly(Vinyl Chloride)-Poly(N,N-Dimethylacrylamide) Polyblend The procedure of Example 18 was repeated again, except that the poly(N,N-dimethylacrylamide) utilized had been exposed to 85 percent relative humidity for six days. The polymer had gained in water content from an initial 1.3 percent to 12.2 percent as determined by the Karl Fischer method.

The films prepared from the polyblends described in Examples 18 to 21 were tested in the manner described above. The results of the tests are set forth hereinbelow.

TABLE 7

Water Absorption Of Test Composition

| Test Specimen | Immersion Period | | |
|---|---|---|---|
| | 1 Hour at R.T. | 18 Hours at R.T. | 1 Hour at 100°C |
| Product of Example 18 | 3.9 | 13.4 | 14.6 |
| Product of Example 19 | 15 | 23 | 16.1 |
| Product of Example 20 | 13.3 | 21.7 | 13.7 |
| Product of Example 21 | 15.1 | 22.1 | 13.1 |

TABLE 8

Weight Change Of Dry Compositions After Absorption Test

| Test Specimen | Immersion Period | | |
|---|---|---|---|
| | 1 Hour at R.T. | 18 Hours at R.T. | 1 Hour at 100°C |
| Product of Example 18 | −0.6 | −1.2 | −0.1 |
| Product of Example 19 | −0.7 | −0.3 | −0.6 |
| Product of Example 20 | −1.5 | −1.2 | −1.3 |
| Product of Example 21 | −1.4 | −1.5 | −1.2 |

The tensile strength in pounds per square inch of the various vapor permeable compositions prepared in Examples 18 to 21 was determined under various conditions hereinafter referred to as Condition A, B, C, or D. The tensile properties were measured in accordance with the procedures detailed by ASTM method D638-64 T. Condition A represents the state of the product after preparation in accordance with the Examples 18 to 21, as herein set forth. Condition B represents the state of the product after immersion in boiling water for a period of 1 hour, followed by drying at a temperature of 70° C for a period of 2 hours. Condition C represents the state of the product after exposure to 85 percent relative humidity for a period of 18 hours at room temperature. Condition D represents the state of the product after immersion in water at room temperature for a period of 18 hours, followed by drying at 70° C for a period of 2 hours. The results of these tests expressed in pounds per square inch are shown in Table 9.

TABLE 9

| Test Specimen | Tensile Strength Condition | | | |
|---|---|---|---|---|
| | A | B | C | D |
| Product of Example 18 | 1500 | 1270 | 1100 | 1540 |
| Product of Example 19 | 2180 | 2390 | 1340 | 2620 |

TABLE 9-Continued

| Test Specimen | Tensile Strength | | | |
|---|---|---|---|---|
| | Condition | | | |
| | A | B | C | D |
| Product of Example 20 | 2160 | 1920 | 1200 | 2620 |
| Product of Example 21 | 1790 | 2180 | 1320 | 2090 |

The effectiveness of the compositions prepared in Examples 18 to 21 as vapor permeable materials was compared in experiments wherein the water vapor transmission of sheets having a thickness of 10 mils was measured. The procedure of ASTM test method E96-63T (B) was used in this experiment. This procedure comprises measuring the amount of water vapor in grams which will permeate a sample which is exposed to 100 percent relative humidity on one side and 50 percent relative humidity on its other side. The results of this procedure are expressed in grams of water transmitted in 24 hours per square meter of surface. The data is shown in Table 10.

TABLE 10

| Test Specimen | Water Vapor Transmission g/24 hrs/m$^2$ |
|---|---|
| Product of Example 18 | 64 |
| Product of Example 19 | 280 |
| Product of Example 20 | 175 |
| Product of Example 21 | 240 |

It is apparent from the data set forth in the Tables above, particularly the data in Table 10 which compares the water vapor transmission of the films, moisture content in the N,N-dimethylacrylamide polymer plays a significant role. Thus, it can be concluded that polyblends prepared from blending N,N-dimethylacrylamide having more than 3 percent moisture produce improved results, particularly when using polymers having hard chunks which are difficult to mill in the blending process.

Solvents other than water or humectants which soften the unsaturated amide polymer such as N,N-dimethylacrylamide exhibit similar results. Exemplary solvents include methanol, glycol, glycerol, and urea.

The following Examples illustrate the preparation of vapor permeable films from a polyblend of a hydrophobic polymer and a polymer of an unsaturated amide by first dissolving the respective polymers in mutual solvent and casting the homogeneous solution as a film.

EXAMPLE 22

Production Of A Vapor Permeable Film From A Poly(Vinyl Chloride)-Poly(N,N-Dimethylacrylamide) Polyblend A composition of 100 parts by weight poly(vinyl chloride) and 50 parts by weight poly(N,N-dimethylacrylamide) and 50 parts by weight dioctyl phthalate were cast as a film from tetrahydrofuran solution. The resulting film was clear. After dipping the clear film into water for short periods of about 10 minutes a very opaque, white film was obtained after the film dried. The opacity was temporarily lost when the film was wetted with water, but the opacity returned when the film dried. Wherever heavy pressure was applied to the opaque film, such as with a fingernail or typewriter keys, that portion of the film became clear. Clear, legible printing by pen or typewriter was also obtained from the vapor permeable films.

EXAMPLE 23

Production Of A Vapor Permeable Film From A Poly(Vinyl Chloride)-Poly(N,N-Dimethylacrylamide) Polyblend A composition of 100 parts by weight poly(vinyl chloride) and 100 parts by weight poly(N,N-dimethylacrylamide) were cast as a film from a solution of tetrahydrofuran. The clear film became highly opaque when treated with water and had good strength and flexibility, as well as good ink receptivity. The water-treated film, as seen by optical microscope, appeared to show a reticulated structure. These voids scatter light to give the opacity in the film. The combination of voids and the poly(N,N-dimethylacrylamide) provided the film with both breathability and improved water vapor transport properties.

The films prepared in Examples 22 and 23 are also useful in preparing synthetic paper or pigmentless paper coatings having excellent pick, wet rub, and good varnish holdout. If desired, the films produced in this manner can be water proofed with a barrier coat applied from hydrocarbon solvents such as toluene.

If desired, solvents other than tetrahydrofuran may be employed in the solvent film forming procedure described in Examples 22 and 23. Those solvents selected will be obvious to those skilled in the art by reference to solubility tables, the only provision being that the solvent used will sufficiently dissolve both the hydrophobic polymer and the polymer of the unsaturated amide. Exemplary solvents in addition to tetrahydrofuran which will dissolve poly(vinyl chloride) and N,N-dimethyl acrylamide polymers include methyl isobutyl ketone and dimethyl formamide.

In addition to the leaching method for obtaining voids in films of the present invention, outstanding physical properties are obtained by including with the aforementioned solvent system a mutually miscible non-solvent for one of the polymers in the polyblend of the present invention, such as an aliphatic or aromatic hydrocarbon. Depending on the quantity of non-solvent employed, either a closed cell structure or an open cell structure can be obtained. For example, by employing about 50 parts by weight of a relatively low volatility non-solvent for one of the polymers in the blend whereby the solvent such as tetrahydrofuran evaporates at a much more reapid rate than a non-solvent, the non-solvent will precipitate in the form of minute droplets in the polymeric film structure and will thereafter evaporate from the film structure by diffusion, leaving behind a plurality of minute closed cells. Films prepared in this manner are highly opaque but are not porous. However, due to the internal void structure in the films, they have the inherent characteristics of being water vapor permeable. Therefore, the presence of both the hydrophilic polymer in the polyblend and the internal voids in the film complement each other to produce extremely useful films.

An open cell structure film can be readily obtained by the use of a non-solvent wherein the non-solvent is employed in copious amounts. In such instances, during film formation the presence of the large amount of non-solvent causes precipitation of the polymers with the subsequent evaporation of the non-solvent from the precipitated matrix, leaving behind open cell voids.

Various modifications of this procedure are well known in the art. However, the use of this system with a combination of hydrophilic and hydrophobic polymers which are compatible with one another has not been described, particularly the outstanding properties resulting therefrom.

Also contemplated within the scope of the present invention is the preparation of breathable vinyl films by a modified plastisol technique. Most of the poly(vinyl chloride) plasticizers do not plasticize poly(N,N-dimethylacrylamide). The known plastisol procedures cannot be used with the polyblends of the present invention.

As a matter of background, the plastisol technique for the preparation of flexible poly(vinyl chloride) films and coatings is well known and used on a large scale industrially. The system consists of a special plastisol grade of poly(vinyl chloride), which is mixed with plasticizer at room temperature to a paste-like slurry and is converted to a film by casting on release paper and curing at 320° F for about 5 to 10 minutes without pressure. Organosols are plastisols to which a solvent is added to reduce the viscosity of the plastisol. They are used in a similar way as plastisols, the solvent being removed during the curing step. Since poly(N,N-dimethylacrylamide) is insoluble in dioctyl phthalate, or other common plasticizers, earlier attempts to make films by simply adding poly(N,N-dimethylacrylamide) to poly-(vinyl chloride) plastisols were unsuccessful.

It has now been found that stable plastisol-type blends can be made of a desirable viscosity by dissolving the poly(N,N-dimethylacrylamide) in a solvent, prior to adding the material to the poly-(vinyl chloride)/dioctyl phthalate plastisol. The requirements for the N,N-dimethylacrylamide polymer solvent are as follows: (1) it must be compatible with the poly(vinyl chloride)/dioctyl phthalate plastisol; (2) the solvent must be a non-solvent for poly(vinyl chloride) itself so as to prevent a large build-up of the viscosity; (3) the boiling point of the solvent must be within the range of 60°–150° C so that it can be easily removed during film formation without excess foaming. Exemplary solvents include alcohols, many of the aromatic compounds, ketones, etc. Normal butanol is the preferred solvent. The following Examples illustrate this embodiment of the invention.

EXAMPLE 24

50 grams of poly(N,N-dimethylacrylamide) are dissolved in 150 grams of n-butanol by stirring at room temperature. This solution is added to a slurry containing 50 grams of poly(vinyl chloride) and 60 grams dioctyl phthalate and mixed by moderate agitation at room temperature. The resulting paste is stable for at least 1 week. Several films were prepared by casting the paste on glass plates utilizing a Gardner knife. After evaporation of the butanol at room temperature for 24 hours, the films were cured for 5 minutes at 150° C. The resulting films were slightly cloudy but smooth and homogeneous. The films exhibited a water vapor transmission as measured by ASTM method E96–Condition B of 700 g/m²/24 hrs.

Using the same procedure as described above, a series of varying amounts of poly(N,N-dimethylacrylamide)(P-NNDMA) in poly(vinyl chloride) (PVC) were made as follows and the water vapor transmission of each of these films were measured (WVT). The results of these tests are shown in Table 11.

TABLE 11

| Test Specimen | PVC | NNDMA | Butanol | DOP | WVT |
|---|---|---|---|---|---|
| Trial No. 1 | 50 | 50 | 150 | 60 | 708 |
| Trial No. 2 | 60 | 40 | 120 | 60 | 536–573 |
| Trial No. 3 | 70 | 30 | 90 | 60 | 432–408 |
| Trial No. 4 | 80 | 20 | 60 | 60 | 252–297 |

It can be seen from the above Table that the water vapor transmission decreases granually with a decrease in poly(N,N-dimethylacrylamide). However, it is quite suprising that the water vapor transmission remains consistently at a much higher level than blends prepared at similar ratios by milling, as described hereinabove.

The advantages of using the aforedescribed plastisol technique in general are well recognized and concern mainly ease of application and more defined and permanent imprints of surface details. The technique described above, which is one of the embodiments of the present invention, differs from the organosol system of the prior art not only in the aspect of breathability in the resulting polymers, but also in that the added solvent is only a solvent for the hydrophilic polymer, i.e., poly(N,N-dimethylacrylamide) and not a solvent for poly(vinyl chloride), and the result obtains a homogeneous film, not to reduce the viscosity of the plastisol.

A further embodiment of the present invention resides in preparing a foamable composition from the polyblends of the present invention. These compositions are prepared by incorporating into the polyblend a blowing agent capable of decomposing to form a gas at a temperature near the softening point of the vapor permeable composition.

Blowing agents which leave no residue upon decomposition which is deleterious to the vapor permeable composition and which are not physiologically objectionable are preferred. The quantity of blowing agent employed can range up to about 10 percent by weight and, preferably, ranges from about 0.2 percent to about 8 percent by weight. Activators for the blowing agents can be utilized when desired.

Exemplary useful blowing agents are azodicarbonamide, N,N'-dimethyl-N,N'-dinitrosoterphthalamide, 4,4'-oxy-bis(benzene sulfonyl hydrazide), dinitrosopentamethylene tetramine, and the like. Water vapor permeable films can also be prepared by frothing the composition with blowing agents such as air, nitrogen or hydrocarbon gases, as well as chloro and fluoro hydrocarbon gases such as the freons.

The vapor permeable compositions of the present invention can be used for a variety of purposes, such as for the manufacture of leather substitutes, upholstery fabrics, rain wear, and the like. It is desirable in many of these applications to provide foamed, flexible sheets which are resilient to the touch. The polyblends of the present invention which contain the hydrophilic polymer are also useful as being a dye receptive plastic. The films of the present invention are also useful in low static build-up coated fabrics and many specialty textile fibers.

It will be appreciated that many modifications of the present invention can be made without departing from the scope thereof. For example, it will be appreciated that the poly(N,N-dimethylacrylamide) can be blended in urethane rubbers or added to a polyester prepolymer prepared from polybutylene adipate prior to curing and applying the same to a textile backing. Additionally, the poly(N,N-dimethylacrylamide) can be blended in with such polymeric binders as the acrylics and polyacrylonitriles to produce breathable, non-woven textile films.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

I claim:

1. A method for producing a water vapor permeable film which comprises:
   a. applying to a substrate a mixture comprising:
      i. a normally hydrophilic linear thermoplastic polymeric material comprising from about 20 to about 50 parts by weight of a polymer of N,N-dimethylacrylamide;
      ii. a normally hydrophobic polymeric material comprising from about 80 to about 50 parts by weight of a plasticized polymer of vinyl chloride, said polymer of vinyl chloride comprising homopolymers and copolymers of vinyl chloride containing at least about 85 percent by weight of poly (vinyl chloride), the combined weights of said normally hydrophilic and hydrophobic polymeric materials being 100 parts by weight; and
      iii. an organic liquid which is a solvent for said normally hydrophillic linear thermoplastic polymeric material and a non-solvent for said normally hydrophobic polymeric material, said organic liquid has a boiling point in the range of from about 60° to about 150° C; and
   b. evaporating said organic liquid from the applied mixture to form a film on said substrate.

2. The process of claim 1, wherein said polymer of N,N-dimethylacrylamide is a homopolymer.

3. The process of claim 1, wherein said polymer of N,N-dimethylacrylamide is comprised of a copolymer or graft copolymer of N,N-dimethylacrylamide, wherein, said comonomers used for forming said copolymer or graft copolymer are comprised of a polymerizable monomer whose polymer has a glass transition temperature below that of a homopolymer of N,N-dimethylacrylamide.

4. The process of claim 3, wherein said comonomers are members selected from the group consisting of butyl acrylate, 2-ethylhexyl acrylate, acrylonitrile and vinyl acetate.

5. The process of claim 1, wherein the plasticizer for said polymer of vinyl chloride is present in amounts ranging from about 5 to about 100 parts by weight per 100 parts by weight of combined normally hydrophilic and hydrophobic polymeric materials.

6. The process of claim 1, wherein said organic liquid is an alcohol.

7. The process of claim 6, wherein said alcohol is n-butanol.

8. The process of claim 1, wherein said mixture is prepared by first dissolving said normally hydrophilic polymeric material in said organic liquid and in a subsequent step adding to the solution of the normally hydrophilic polymeric material and organic liquid said plasticized polymer of vinyl chloride.

9. The process of claim 1, wherein the film is cured subsequent to removal of the organic liquid.

10. A coated article comprising a substrate coated by the method of claim 1.

* * * * *